United States Patent
Roden et al.

[11] Patent Number: 6,151,681
[45] Date of Patent: Nov. 21, 2000

[54] DYNAMIC DEVICE POWER MANAGEMENT

[75] Inventors: Philip A. Roden, Plano; Patrick C. Neil, Richardson; David W. Rekieta, McKinney, all of Tex.

[73] Assignee: Texas Instruments Incorporated, Dallas, Tex.

[21] Appl. No.: 09/102,245

[22] Filed: Jun. 22, 1998

Related U.S. Application Data

[60] Provisional application No. 60/050,734, Jun. 25, 1997.

[51] Int. Cl.[7] ........................................ G06F 1/12
[52] U.S. Cl. ........................................ 713/322; 709/400
[58] Field of Search ........................ 713/500, 322, 713/600; 714/12; 709/248, 400

[56] References Cited

U.S. PATENT DOCUMENTS

| | | | |
|---|---|---|---|
| 5,361,364 | 11/1994 | Nagashige | 713/300 |
| 5,392,437 | 2/1995 | Matter | 713/324 |
| 5,428,790 | 6/1995 | Harper | 713/322 |
| 5,615,376 | 3/1997 | Ranganathan | 713/300 |
| 5,630,143 | 5/1997 | Maher | 713/310 |
| 5,734,878 | 3/1998 | Hongo | 395/559 |
| 5,901,322 | 5/1999 | Herbst | 713/322 |
| 5,919,263 | 7/1999 | Kikinis | 713/320 |
| 5,983,014 | 11/1999 | Shay | 327/270 |
| 5,983,356 | 11/1999 | Pandey | 713/322 |

*Primary Examiner*—Eric Coleman
*Attorney, Agent, or Firm*—Dwight N. Holmbo; Wade James Brady, III; Frederick J. Telecky, Jr.

[57] ABSTRACT

A power management method and system which includes providing a system having a plurality of clock operated circuits, each clock operated circuit being operable in response to the receipt of clock signals. A first subplurality of the clock operated circuits receives an uninterrupted stream of clock signals and thereby is uninterruptably operable and a second plurality of the clock operated circuits receives a normally off interruptable stream of clock signals and is normally inoperable. The system is sampled for the presence of data signals being input thereto. The clock signals are sent to the second plurality of circuits in response to the sampling the presence of data signals being input to the system to cause the second plurality of circuits to be operable. The data signals are transmitted to the second plurality of circuits after a time delay equal to or greater than the expired time from the sampling to the sending. The system can have a plurality of input/output terminals with the sampling comprising being at each of the input/output terminals. The system includes a clock for providing the clock signals and a decode logic for sampling at one of the input/output terminals and an arbiter circuit for sampling at the other input/output terminal.

16 Claims, 1 Drawing Sheet

DYNAMIC DEVICE POWER MANAGEMENT

This application claims priority under 35 USC 119(e)(1) of provisional application number 60/050,734 filed Jun. 25, 1997.

BACKGROUND OF THE INVENTION

1. Field of the Invention

This invention relates to a power management system for use primarily in conjunction with portable, battery operated electronic systems, such as, for example, personal computers.

2. Brief Description of the Prior Art

Each generation of portable personal computers sets new standards in lower weight, higher processor speed, increased resolution for displays and lower power consumption. The pursuit for lower power consumption presents a challenge because it must be balanced with a need for increased functionality and performance. In order to meet these requirements, power control methods have evolved in the industry as industry standards and also as proprietary solutions. The PCI (peripheral component interconnect) mobile Design Guide is one such industry standard which implements the clock run protocol for power saving in a mobile system. Several other key industry standard power management standards, such as OnNow™ initiative, Advanced Configuration and Power Interface Specification (ACPI) and PCI power management PCIPM are being drafted currently to meet the aggressive power consumption goals for future desktop and mobile systems.

SUMMARY OF THE INVENTION

In accordance with the present invention, the power consumption of the PCMCIA (Personal Computer Memory Card International Association) and card bus handling circuit for use in conjunction with computers is materially reduced. This reduction in power consumption is based upon the mode of operation in which the device is operating. When the device is fully operational, the present invention allows power to be conserved between device operations without sacrificing functionality. This has resulted from an observation that the power consumption of the device increases with an increase in the frequency of operation and is typical of CMOS circuitry. This leads to the conclusion that most of the power dissipation comes from clock-related circuitry. Accordingly, this invention is directed to minimizing the operating time of the clock circuitry.

Briefly, the above described reduction in power consumption is achieved by actively switching the internal clock of the device based upon the external events requiring use of internal elements of the circuit. The circuit looks for precursors to the requirement for operation of the device and, in response to such precursors, switches on the clock in a timely manner to provide proper circuit operation. The clock is then shut down or gated when operation of the circuit is not required. This solution allows the entire system to operate normally while the device actively switches internal circuitry, yet conserve power. Many systems would require external software or hardware to switch on/off power or clocks to the device. Furthermore, no device functionality is lost because, when a particular portion of the circuitry is required, that portion of the circuitry is reactivated.

DESCRIPTION OF THE PREFERRED EMBODIMENT

Figure 1:
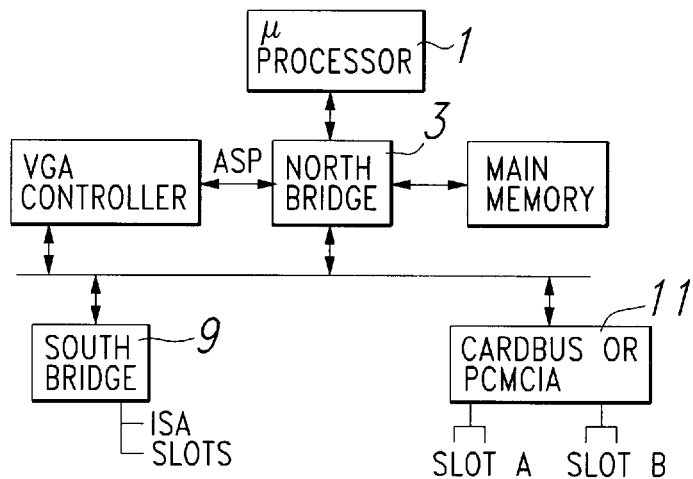
FIG. 1 is a block diagram showing the architecture for a typical notebook computer.

Referring to FIG. 1, there is shown the architecture for a typical prior art notebook computer. The architecture includes a microprocessor 1, such as, for example, an Intel Pentium chip which is coupled through a north bridge 3 (which acts as an interface between main memory, the processor and the primary bus PCI) to the primary bus PCI. The primary bus is couple to a VGA circuit 5 which controls the monitor, a memory 7, a south bridge 9 to which are connected, for example, the keyboard, mouse and plural ports and a card bus or PCMCIA handling circuit 11 through which devices including ethernet, modems, LAN, soundblaster cards, hard drives, CD ROMs, etc. can be attached to the computer with the power on. With reference to the card bus or PCMCIA handling circuit 11, principal considerations are power, cost and performance. Any decrease in the power requirements extends length of operation of the battery between required recharging as well as battery life and such power requirement decreases are constantly being sought. It is circuit of this type to which the present invention principally applies.

Figure 2:
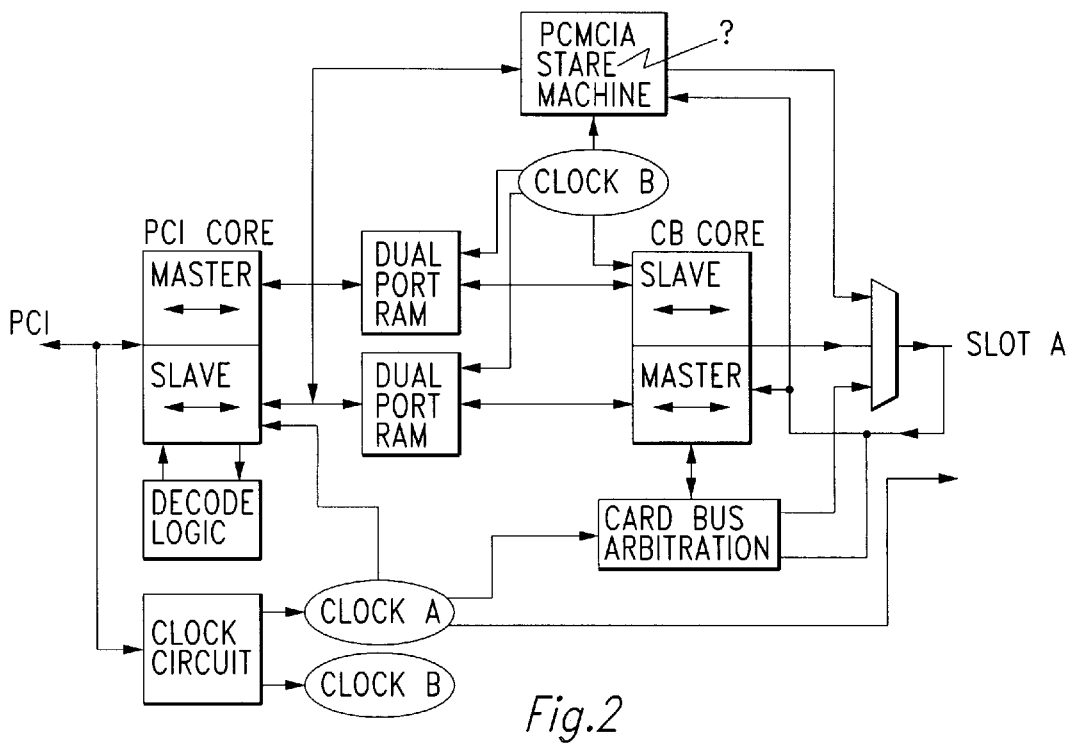
FIG. 2 is a block diagram of the pertinent portion of the card bus PCMCIA circuit of FIG. 1 showing a preferred embodiment of the present invention in conjunction therewith.

Referring to FIG. 2, there is shown the pertinent portion of the card bus or PCMCIA handling circuit 11 of the prior art of interest in conjunction with the present invention. The system transmits information from the PCI bus to slot A or transmits information from slot A to the PCI bus. This is accomplished by transmitting data from the PCI bus to slot A via the slave portion of a PCI core, through a first dual port RAM and via the master portion of a card bus core to a multiplexer coupled to slot A. The card bus core is under the control of an arbiter which determines whether or not information is passed therethrough. The system transmits information from slot A to the PCI bus by transmitting this data through the multiplexer coupled to slot A to the slave portion of the card bus core and then via a second dual port RAM and the master section of the PCI core to the PCI bus. Alternatively, the system transmits information from slot A to the PCI bus by transmitting this data through the multiplexer coupled to slot A to the PCMCIA state machine and then via the slave portion of the PCI core to the PCI bus. In addition, the circuit includes decode logic which recognizes that data is entering the PCI core for transmission therefrom and a clock circuit for providing clock signals to the various circuit elements thus far described with reference to FIG. 2.

In the prior art system, there is a single clock which controls all of the elements shown in FIG. 2 and which is operational on a continual basis. This wastes a great deal of power since portions of the circuitry are required to be operative on an intermittent basis. Accordingly, if circuitry can be turned off or gated when not required, there is a saving in the power required for operation of the system or, in the present case, the computer.

In accordance with the present invention, the concept is to turn off or gate the clock to the portions of the circuit which is not being used, yet be ready to turn the clock on when required with sufficiently small delay such that the turned off circuits are operational when actually needed. This is accomplished in the card bus 11 by providing a clock which provides both a constant clock signal A and a gated clock signal B, both of the same frequency and in phase with each other. The clock circuit activates the clock signal B when it receives an activate signal from the decode logic or arbiter at its activate input and renders the clock signal B of or gated when it receives an idle signal at its idle input or when it no longer receives an activate signal on its activate input. As can be seen in FIG. 2, the core logic responds to activity in the PCI core from the PCI bus by providing a signal to the clock circuit to activate the clock signal B and the arbiter circuit responds to an arbitration signal thereto from slot A due to incoming activity at slot A to provide a signal to the clock circuit to activate the clock signal B. This provides for activation of the clock signal B for signals travelling from the PCI bus to slot A and for signals travelling from slot A to the PCI bus.

As can also be seen in FIG. 2, each of the PCI core, decode logic, arbiter and slot A receive the clock signal A which is on at all times. On the other hand, each of the first and second dual port RAMs, PCMCIA state machine and card bus (CB) core receive the clock signal B which is on only when the clock is activated by an activate clock B signal from either the decode logic or the arbiter. The activate signal is provided as long as data is being received either from the PCI bus or from slot A. Since the time delay for signal travel through the PCI core after detection by the decode logic is greater than the time required to turn on the clock B signal and since the time delay for signal travel through the multiplexer after arbitration by the arbiter and turn on of the clock B signal is greater than the time required to turn on the clock B signal, no information is lost.

It can therefore be seen that when no cards are inserted in slot A, this meaning that there is no activity in this region and that slot A is not prepared to transmit information to the PCI bus, there is no clock signal to a major portion of the circuit and that portion of the circuit is turned off. Likewise, when no signals are provided from the PCI bus and the PCI core is not prepared to transmit information, meaning that there is no activity on the PCI bus relating to the PCMCIA circuit 11, the same clock B signal is turned off or gated and the circuitry using that clock signal is turned off. It is apparent that a major portion of the circuitry is turned off and requires no power when not operational, thereby providing a material energy saving.

As a further embodiment, the clock circuit can provide a plurality of clock B signals, each having the same phase and frequency, however, for example, in the case of the circuit of FIG. 2, when an activate clock B signal is received from the decode logic, clock B signals will be sent only to those units which require energization at that time, namely the first dual port RAM, and the card bus (CB) core whereas the second dual port RAM and PCMCIA state machine will not be energized by not receiving a clock B signal. When an activate clock B signal is received from the arbiter, the card bus (CB) core, PCI core and second dual port RAM will receive a clock B signal and/or the PCMCIA state machine along with the PCI core will receive a clock B signal whereas the first dual port RAM will not receive such signal. This will provide an additional, though generally small further power saving.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A power management method which comprises the steps of:

(a) providing a system having a plurality of clock operated circuits, each of said clock operated circuits being operable in response to the receipt of clock signals, with a first subplurality of said clock operated circuits receiving an uninterrupted stream of clock signals from a first clock and thereby being uninterruptably operable and a second subplurality of said clock operated circuits receiving a normally off interruptible stream of clock signals from a second clock and being normally inoperable, wherein the first and second clocks are continuously synchronized in phase and have a common operating frequency;

(b) sampling said system for the presence of data signals being input to said system;

(c) sending said clock signals from said second clock to said second subplurality of circuits in response to the sampling the presence of data signals being input to said system to cause said second subplurality of circuits to be operable; and (d) transmitting said data signals to said second subplurality of circuits after a time delay equal to or greater than the expired time from said step of sampling to said step of sending.

2. The method of claim 1 further including the step of providing a plurality of system input/output terminals, said step of sampling comprising the step of sampling at each of said input/output terminals.

3. The method of claim 1 wherein said system is provided with a first clock for providing said uninterrupted stream of clock signals, a second clock for providing said normally off interruptible stream of clock signals and a decode logic for said sampling, said decode logic providing a signal to said second clock responsive to said sampling the presence of data signals.

4. The method of claim 2 wherein said system is provided with a first clock for providing said uninterrupted stream of clock signals, a second clock for providing said normally off interruptible stream of clock signals and a decode logic for said sampling at one of said input/output terminals, said decode logic providing a signal to said second clock responsive to said sampling the presence of data signals.

5. The method of claim 1 wherein said system is provided with a first clock for providing said uninterrupted stream of clock signals, a second clock for providing said normally off interruptible stream of clock signals and an arbiter circuit for receiving an arbitration signal at said input to said system to be sampled, said arbiter circuit providing a signal to said second clock responsive to said receipt of said arbitration signal.

6. The method of claim 2 wherein said system is provided with a first clock for providing said uninterrupted stream of clock signals, a second clock for providing said normally off interruptible stream of clock signals and an arbiter circuit for receiving an arbitration signal at one of said input/output terminals to said system to be sampled, said arbiter circuit providing a signal to said second clock responsive to said receipt of said arbitration signal.

7. The method of claim 3 wherein said system is provided with a first clock for providing said uninterrupted stream of clock signals, a second clock for providing said normally off interruptible stream of clock signals and an arbiter circuit for receiving an arbitration signal at said input to said system to be sampled, said arbiter circuit providing a signal to said second clock responsive to said receipt of said arbitration signal.

8. The method of claim 4 wherein said system is provided with a first clock for providing said uninterrupted stream of clock signals, a second clock for providing said normally off interruptible stream of clock signals and an arbiter circuit for receiving an arbitration signal at one of said input/output terminals to said system to be sampled, said arbiter circuit providing a signal to said second clock responsive to said receipt of said arbitration signal.

9. A power management system which comprises:

(a) a system having a plurality of clock operated circuits, each of said clock operated circuits being operable in response to the receipt of clock signals, with a first subplurality of said clock operated circuits receiving an uninterrupted stream of clock signals from a first clock and thereby being uninterruptably operable and a second subplurality of said clock operated circuits receiving a normally off interruptible stream of clock signals from a second clock and being normally inoperable, wherein the first and second clocks are continuously synchronized in phase and have a common operating frequency;

(b) sampling circuitry for sampling said system for the presence of data signals being input to said system; and (c) circuitry sending clock signals from said second clock to said second subplurality of circuits in response to the sampling the presence of data signals being input to said system to cause said second subplurality of circuits to be operable;

(d) said system including a time delay for transmitting said data signals to said second subplurality of circuits after said time delay equal to or greater than the expired time from said sampling to said sending.

10. The system of claim 9 further including a plurality of system input/output terminals, said sampling circuitry sampling at each of said input/output terminals.

11. The system of claim 9 further including a first clock for providing said uninterrupted stream of clock signals, a second clock for providing said normally off interruptible stream of clock signals and a decode logic for said sampling, said decode logic providing a signal to said second clock responsive to said sampling the presence of data signals.

12. The system of claim 10 wherein said system further includes a first clock for providing said uninterrupted stream of clock signals, a second clock for providing said normally off interruptible stream of clock signals and a decode logic for said sampling at one of said input/output terminals, said decode logic providing a signal to said second clock responsive to said sampling the presence of data signals.

13. The system of claim 9 wherein said system further includes a first clock for providing said uninterrupted stream of clock signals, a second clock for providing said normally off interruptible stream of clock signals and an arbiter circuit for receiving an arbitration signal at said input to said system to be sampled, said arbiter circuit providing a signal to said second clock responsive to said receipt of said arbitration signal.

14. The system of claim 10 wherein said system further includes a first clock for providing said uninterrupted stream of clock signals, a second clock for providing said normally off interruptible stream of clock signals and an arbiter circuit for receiving an arbitration signal at one of said input/output terminals to said system to be sampled, said arbiter circuit providing a signal to said second clock responsive to said receipt of said arbitration signal.

15. The system of claim 11 wherein said system further includes a first clock for providing said uninterrupted stream of clock signals, a second clock for providing said normally off interruptible stream of clock signals and an arbiter circuit for receiving an arbitration signal at said input to said system to be sampled, said arbiter circuit providing a signal to said second clock responsive to said receipt of said arbitration signal.

16. The system of claim 12 wherein said system further includes a first clock for providing said uninterrupted stream of clock signals, a second clock for providing said normally off interruptible stream of clock signals and an arbiter circuit for receiving an arbitration signal at one of said input/output terminals to said system to be sampled, said arbiter circuit providing a signal to said second clock responsive to said receipt of said arbitration signal.

* * * * *